United States Patent
Bridenbaugh et al.

[15] 3,665,205
[45] May 23, 1972

[54] MODIFIED LITHIUM NIOBATE COMPOSITION AND DEVICES UTILIZING SAME

[72] Inventors: Paul Michael Bridenbaugh, Piscataway; John Robert Carruthers, Murray Hill; Franklin Richard Nash, Griggstown, all of N.J.

[73] Assignee: Bell Telephone Laboratories, Incorporated, Murray Hill, Berkeley Heights, N.J.

[22] Filed: Feb. 16, 1971

[21] Appl. No.: 115,467

[52] U.S. Cl. .................... 307/88.3, 321/69 R, 331/107 R
[51] Int. Cl. .......................................................... H03f 7/00
[58] Field of Search .................... 307/88.3; 321/69; 331/107

[56] References Cited

UNITED STATES PATENTS 3,528,765  9/1970  Fay et al. ........................... 330/4.5

*Primary Examiner*—Roy Lake
*Assistant Examiner*—Darwin R. Hostetter
*Attorney*—R. J. Guenther and Edwin B. Cave

[57] ABSTRACT

The phase-matching temperature for different frequencies of electromagnetic waves in $LiNbO_3$ is increased by the addition of MgO to the melt. Variation of this temperature in successive portions of the grown crystal is minimized. The resulting product is usefully incorporated in nonlinear optical devices such as second harmonic generators and parametric oscillators designed for operation at elevated temperatures at which radiation damage is annealed out.

6 Claims, 4 Drawing Figures

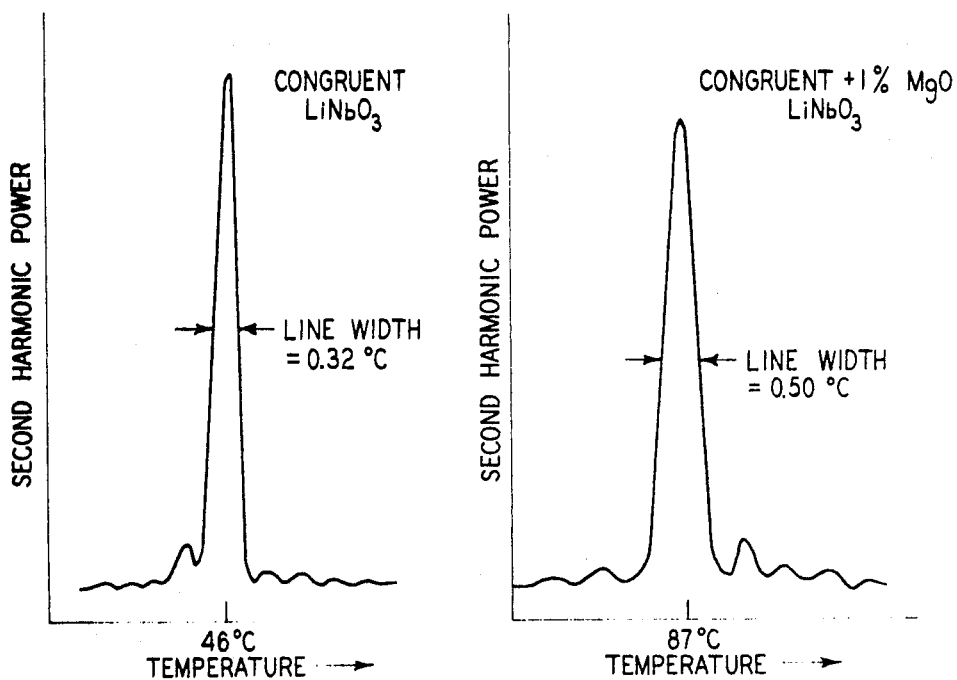
FIG. 2A
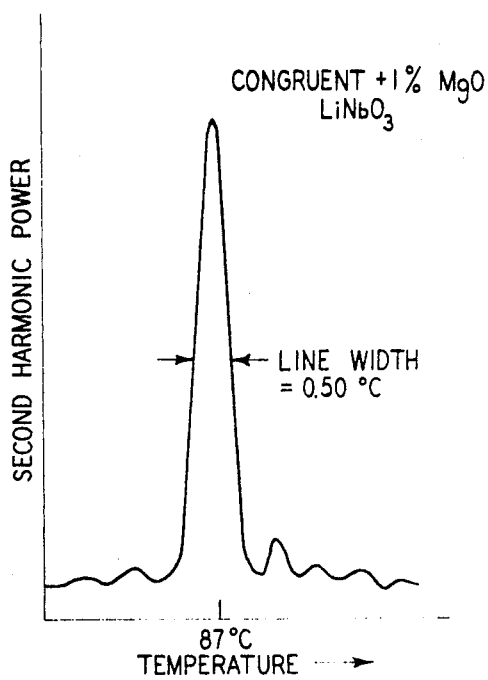
FIG. 2B
FIG. 3
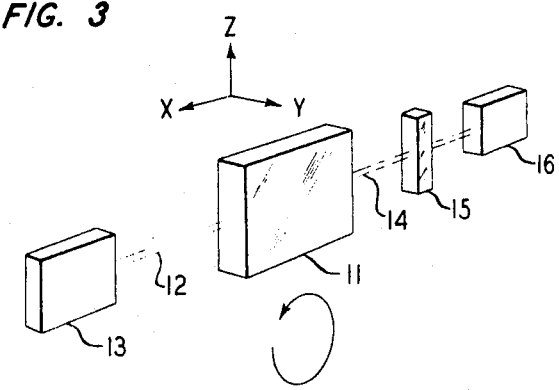

MODIFIED LITHIUM NIOBATE COMPOSITION AND DEVICES UTILIZING SAME

BACKGROUND OF THE INVENTION

1. Field of the Invention

The invention is concerned with nonlinear devices designed for altering the frequency of traversing electromagnetic waves as, for example, by harmonic generation or parametric oscillation.

2. Description of the Prior Art

"Nonlinear" devices are popularly utilized in the frequency conversion of electromagnetic radiation in and near the visible spectrum. Such devices are based on the nonlinear dependence of polarizability on wave amplitude. Types of devices include harmonic generators, e.g., second harmonic generators (SHG), and a variety of parametric devices which usually result in a downshifting of frequency. Operation of oscillators used on the latter principle may involve two frequencies as in the degenerate case or three frequencies as in the nondegenerate case. Interest in this technology is traced largely to the advent of the laser and to the recognition that the number of fundamental frequencies now available and likely to be available from such sources is limited.

An early recognized difficulty in parametric devices arises from frequency dispersion, i.e., the velocity dependence on frequency for electromagnetic wave energy generally observed in any real medium. While the nonlinear relationship does result in frequency conversion, the differing velocity of the generating and generated waves resulted in successive constructive and destructive action. The effect is successive cancellation producing a null point at each position at which successively generated waves are 180° out of phase. In practice, this condition gives rise to a "coherence length" defined as the distance over which the two waves of concern are sufficiently close to being in phase to result in continued amplification of the generating wave. Use of materials of greater thickness in the transmission direction is not advantageous since the generation process may be considered as starting afresh at each 180° interval.

The problem of dispersion in nonlinear devices has been approached from different directions. Easily the most popular solution involves the use of birefringent nonlinear material in which the birefringence is sufficiently large that the velocity shift for different polarizations of frequencies of concern is as large as the velocity shift due to dispersion, see Vol. 8, *Physical Review Letters*, (1962), p. 19. In devices in which phase matching is accomplished by use of birefringence, the polarization and wave direction of radiation incident on the medium is such that a wave of a first frequency and polarization travels at a velocity equal to that of a second frequency and polarization. The principle is applicable to phase matching of three frequencies as well.

Crystalline materials of primary concern for use in birefringence phase-matching nonlinear devices have an optic axis (along which there is no birefringence). Maximum birefringence and, therefore, maximum divergence of frequencies which are phase matchable result when the incident radiation is normal to the optic axis. Frequencies of lesser divergence are phase matched for incidence angles differing from 90°. Use of an incidence angle other than 90°, however, results in refractive loss of energy by "walk off." The preferred conditions are, therefore, those which result in phase matching for incident radiation at 90° to the optic axis. This condition is known as "noncritical phase matching."

The first material, in which birefringence phase matching was reported, was KDP (potassium dihydrogen phosphate). This material continues to be of device interest. Commercial survival of KDP, however, is due largely to ready availability of requisite size and quality sections as compared to other nonlinear materials.

Two later materials, $LiNbO_3$ and a mixed crystal of barium sodium niobate, are phase matchable over a broad frequency range and have nonlinear coefficients of far greater magnitude than that of KDP.

Of the two later materials, the most recent, barium sodium niobate, appears the more desirable by reason of its device characteristics. Growth procedures have, however, not been developed to the stage required for large scale production, and this material continues to be quite expensive.

$LiNbO_3$ is generally available in large sections of good crystalline perfection, and it appears from the literature that this material is considered by many to be a promising candidate for nonlinear use. $LiNbO_3$, however, has a shortcoming which is considered to be significant from a device standpoint. It has been observed that exposure of this crystalline material to light intensities of the amplitude ordinarily encountered in laser experiments soon produces local inhomogeneities in refractive index which, since they act as light scattering centers, quickly render the material useless.

The discovery that radiation damaged $LiNbO_3$ could be recovered by annealing (12 *Applied Physics Letters* 186 (1968)) gave rise to the possibility of operation at elevated temperature such that radiation damage could be avoided. (The severity of radiation damage is intensity related.) To eliminate damage, operation at temperatures of the order of at least 170° to 250° C are indicated.

Another difficulty associated with lithium niobate, now overcome, was concerned with compositional variations observed to occur during growth from the melt. These gave rise to concomitant variations in refractive indices and, in turn, to variations in noncritical phase-matching temperature. The solution to this problem came about upon observation that a congruently melting composition resulted when the melt contained a molar ratio of $Li_2O/Li_2O+Nb_2O_5$ of 0.486. This, of course, represents a departure from stoichiometry for the nominal composition $LiNbO_3$.

Phase-matching temperature (and this terminology hereafter used to mean noncritical phase-matching temperature) is dependent on birefringence as noted and birefringence, in turn, decreases with increasing temperature. Phase-matching temperature is, of course, also dependent on other factors such as dispersion and the frequencies of concern. The largest birefringence in usual device use occurs for the case in which one frequency is twice the other, i.e., for SHG or degenerate downshifting. Of course, it varies too for the particular frequencies involved.

As a relevant example, phase matching for degenerate downshifting of the 5,145 A line of the argon-ion laser occurs at about 15°C for crystals of $LiNbO_3$ grown from a stoichiometric melt. The desire to operate above the "damage" temperature of, for example, about 250°C is in no way advanced by use of a congruent melt, since phase matching for the same frequencies in crystals so produced occurs at about −65° C. Most other parametric applications involving other frequencies require still higher phase-matching temperatures.

There is, therefore, a desire to produce a lithium niobium crystal which may be phase matched above the damaged temperature and which shows the homogeneities in refractive index associated with crystals grown from congruent melts.

SUMMARY OF THE INVENTION

Growth of lithium niobium from a congruent melt modified by addition of magnesium oxide, MgO, results in crystals having increased phase-matching temperature for any given pair of frequencies while evidencing the uniformity in refractive index previously characterized only by growth from the nominal 0.486 molar ratio congruent melt. Generally, the amount of MgO to be added to the melt is from 1 to 8 mol percent based on the entire melt. Within this range, larger increases of MgO results in further increasing of phase-matching temperature for any given set of frequencies. This corresponds to a range of from about 1.5 mol percent to about 12 mol percent in the solid end product.

BRIEF DESCRIPTION OF THE DRAWING

FIGS. 2A and 2B, on coordinates of second-harmonic power and temperature, are plots illustrating the effect of homogeneity of a material, in accordance with the invention, in terms of generated power at a given wavelength. These figures are discussed in conjunction with the description of Examples 1 and 2; and FIG. 3 is a schematic view of a nonlinear device using a material of the invention.

DETAILED DESCRIPTION

Figure 1:
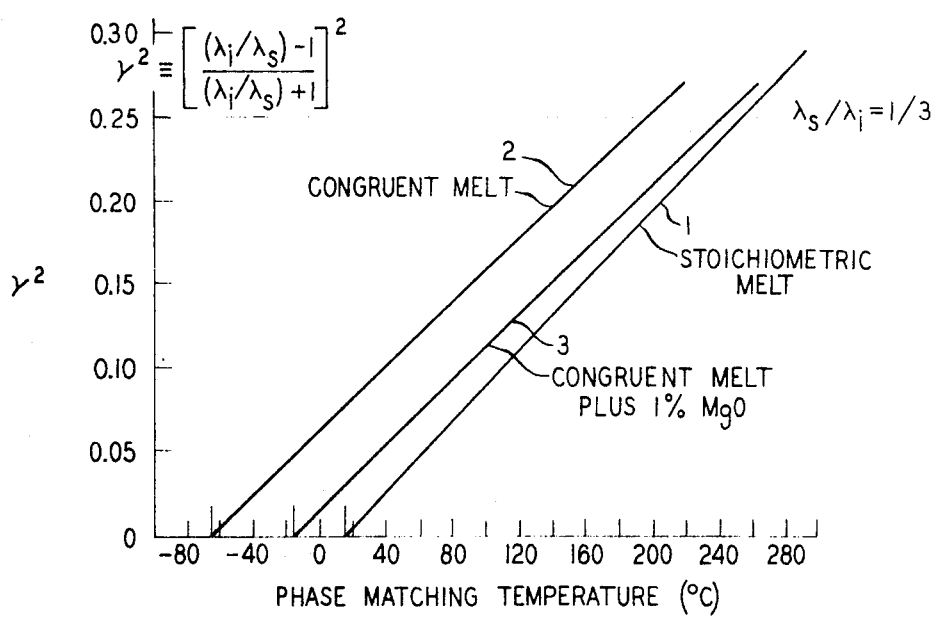
FIG. 1, on coordinates of a function of the second power of wavelength and phase-matching temperature, is a plot showing the relationship between these two parameters for crystals grown from three different melts; the first stoichiometric, the second congruent, and the third a congruent melt modified by the addition of MgO in accordance with the invention.

1. Terminology a. In accordance with conventional practice, the relevant material is referred to herein as lithium niobium or simply $LiNbO_3$. It should be understood that this is merely a nominal composition designation and that, by definition, neither the unmodified material nor that modified in accordance with the invention is ever of that precise composition. In fact, the lithium to niobium ratio rarely, if ever, corresponds with the atom ratio indicated by the stoichiometric compound.

b. As has been indicated, the terminology "phase-matching temperature" is intended to mean noncritical phase-matching temperature or, in other words, the temperature at which phase matching results for a beam introduced normal to the optic axis. Of course, "phase-matching temperature," per se, is not meaningful without designating the frequencies of concern. Where use is made of this terminology without designating such frequencies, it is to be understood that the use is comparative and that it is intended only that this temperature for a given set of frequencies follows whatever relationship is indicated.

c. "Congruently melting" composition or melt has reference to the composition which may be melted and refrozen without any alteration in composition. It follows that such a congruent melt may be frozen in its entirety without any variation in lithium to niobium ratio in the growth direction. Insofar as is relevant to this description, such congruency relates only to the composition before modification by addition of magnesium. It is inherent in the inventive teaching (and, in fact, responsible for its value) that the modified composition is incongruent. The growing crystal shows a continuous variation in Li/Nb ratio and also in Mg/Li ratio. It is the essence of the invention that the distribution coefficients are such that the compositional variations are self-compensating in that the final product shows a consistency in refractive index in the growth direction (of course, while having increased phase-matching temperature).

d. The congruent composition in the nominal system $LiNbO_3$ has been established to a precision of three decimal places. It has been indicated that the molar ratio is 0.486 in terms of $Li_2O/Li_2O+Nb_2O_5$. While it has been established that this is the optimum unmodified composition for the practice of this invention, a practical range of 0.486 ± 0.004 is considered satisfactory for many purposes. Deviation from optimum does not affect the self-compensating nature of the Mg/Li ratio and the variation in refractive index of the resulting product is approximately that of the unmodified growing congruent crystal. "Congruency" or similar terminology has reference to this molar ratio range in the unmodified melt (or crystal).

2. Composition

The unmodified composition has been indicated under Terminology. It is fundamentally that which has already been established as congruently melting (see Vol. 42, Journal of Applied Physics (Apr. 1971)). It has been indicated that the modification consists of addition of from 1 to 8 percent by mol of MgO to the melt. This corresponds to a 1.5 percent to 12 weight percent content of MgO in the final product based on total composition. In actuality, the amount of MgO (and also the relative amounts of lithium oxide and niobium oxide) constantly vary during growth. The actual composition of concern is the initial composition (either of the melt or of the crystal) since it is this composition which establishes the phase-matched temperature. Subsequent variation in composition has no effect on phase-matched temperature.

Appropriate starting compositions are selected on the basis of information such as that referred to by FIG. 1. It is the essence of phase matching that different polarization waves of different frequencies may travel at such velocities through the crystal as to meet the phase-matching conditions (for the simple two-frequency case this calls merely for equal velocity of both polarizations). As temperature is increased, the ferroelectric Curie point of the material is approached. For a given incident frequency, the phase-matching temperature, therefore, increases as the frequency of, for example, the generated wave approaches that of the initial wave. It is seen, therefore, that the degenerate case (or the equivalent up conversion, i.e., SHG) requires the highest birefringence and, therefore, results in the lowest phase-matching temperature for any given composition. (In the above discussion, variation of dispersion with temperature has been ignored — the overall effect being as though temperature dependence of bire-fringence were controlling. In fact, dispersion does vary with temperature but the simplified criterion is adequate for this discussion.)

It follows from the above that the amount of MgO added to the melt is to be selected in accordance with the desired phase-matching conditions. Since it is essential to the invention that operation be at a temperature in excess of at least 170°C and preferably 250° C to avoid radiation damage and since increasing the amount of MgO increases phase-matching temperature, the minimum amount required decreases as the frequencies of the waves of concern diverge.

3. The Figures

The data of FIG. 1 is plotted in the manner described in the literature, see 17 Applied Physics Letters 104 (1970). Information plotted on this figure is for a stoichiometric melt (curve 1), a congruent melt (curve 2), and an MgO containing melt (curve 3). The latter is based on a crystal grown from a composition initially containing 1 mol percent MgO based on a total of the initial constants; MgO, $Li_2O$, and $Nb_2O_5$. Based on other experiments, it has been determined that MgO addition increases the phase-matching temperature by an amount of approximately 27°C per mol percent on the same basis. The plotted form is quite useful in that it yields phase-matching temperatures for any given set of wavelengths whether degenerate or nondegenerate. The method by which such information may be determined from the curve form presented, while described in detail in the noted reference, is briefly set forth. The ordinate units are defined on the figure as $$\gamma^2 = \left[\frac{(\lambda_i/\lambda_s) - 1}{(\lambda_i/\lambda_s) + 1}\right]^2 \quad (1)$$

where $\lambda_i$ is the idler wavelength and $\lambda_s$ is the signal wavelength in the same units. The abscissa units are phase-matching temperature in degrees centigrade. The necessary phase-matching temperature is determined simply by selecting the desired signal wavelength and the necessary idler wavelength in accordance with the relationship $$1/\lambda_p = 1/\lambda_s + 1/\lambda_i \quad \text{Equation (2)}$$

where $\lambda_p$ is the pump wavelength. So, for example, for a pump wavelength $\lambda_p$ equal to 0.5145 $\mu$ (micrometer) and for a signal wavelength to idler wavelength ratio of 1/3, the phase-matched temperature is approximately 250°C.

The figures denoted 2A and 2B are discussed under the section entitled "Examples" below.

In FIG. 3 there is depicted a single crystal body 11 of LiNbO$_3$. The crystallographic orientation of the body is indicated on the figure. A coherent electromagnetic beam 12 produced by source 13 is introduced into body 11, as shown. The resultant emerging beam 14 is then caused to pass through filter 15, and, upon departing, is detected by apparatus 16. For the SHG case, beam 12 is of a fundamental frequency while departing beam 14 additionally contains a wave of frequency corresponding with the first harmonic of beam 12. Filter 15 is of such nature as to pass only the wave of concern, in the SHG instance, that of the harmonic. Apparatus 16 senses only that portion of the beam leaving filter 15. The value of $\theta_m$ may be varied in body 11 by altering the angle between beam 12 and the Z axis, as by rotating the crystal about the Y axis. As has been indicated, the maximum birefringence is obtained for an angle of 90 degrees.

The device of FIG. 3 may similarly be regarded as a three-frequency device, with beam 12 containing frequencies to be mixed or consisting of a pump frequency. Under these conditions, exiting beam 14 contains signal and idler frequencies as well as pump, representing three distinct values for nondegenerate operation. For any operation, whether two frequency or three, efficiency is increased by resonance. Such may be accomplished by coating the surfaces of crystal 11, through which the beam enters and exits. This coating may be partially reflecting only for a generated frequency, as for example for the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of the crystal 11 as to support the frequencies of concern. Simultaneous support of the pump frequency may similarly be accomplished. However, the complication so introduced is justified only when the pump level requires it.

The crystalline orientation shown as the initial position for crystal 11 in the apparatus of FIG. 3 eliminates the effect of double refraction, as has been discussed. This angle may be retained for a broad range of conditions when operating either in the degenerate or nondegenerate mode simply by controlling temperature.

It has been indicated that the device depicted in FIG. 3 is merely exemplary of a large class of nonlinear devices utilized as harmonic generators, parametric mixers, parametric amplifiers, et cetera. Such a class of devices is described in detail in copending U.S. application Ser. No. 414,366, filed Nov. 27, 1964.

4. Examples

The examples yielded data which has been plotted as FIGS. 2A and 2B. The first of the figures corresponding with Example 1 contains data taken from a sample of LiNbO$_3$ grown from a congruent melt. The second of the figures (Example 2) contains data taken from an experiment conducted on a sample of the same congruent ratio but containing approximately 1 mol percent of MgO, based on initial ingredients in the melt (this corresponded to approximately 1½ mol percent of MgO on the same basis in the initial portion of crystal drawn from the melt).

Example 1

A crystal of nominal composition LiNbO$_3$ was grown by Czochralski growth from a melt of the composition 48.6 mol percent Li$_2$O and 51.4 mol percent Nb$_2$O$_5$. A crystal of the approximate length of 3 centimeters with an approximate cross-sectional area of 1 square centimeter was pulled over a period of approximately 8 hours in air. After cutting and polishing, the sample was 2.31 cm. in length and of square cross section. The ends were optically polished.

The sample was irradiated through an end with a light beam of wavelength 1.08 micrometers produced by a helium-neon laser, and the intensity of the signal (5,400 A) was measured with varying temperature.

FIG. 2A indicates the power of the output signal as a function of temperature peaked at 46°C with a line width of 0.32°C.

EXAMPLE 2

FIG. 2B contains similar information for an example grown from a melt such as that described above but modified by substitution of MgO. The amount of MgO included in the melt was 1 mol percent. The amounts of other starting ingredients were as set forth in Example 1. The final crystal composition grown under the conditions set forth in Example 1 maintained a substantially constant birefringence over a crystal section length of 1.49 cm. The initial part of the crystal grown contained approximately 1.5 mol percent magnesium (with attendant reduction in lithium by about 3 mol percent). Peak power for the signal wavelength of 5,400 A was at about 87°C (an increase of about 41°C as compared with the congruent crystal) and line width was about 0.50°C. This value is comparable to that found for the congruent crystal in FIG. 2A when consideration is given to the different lengths.

From these and other examples it was found that line width was sufficiently narrow for most device uses only when the initial melt was substantially congruent (48.6 mol percent ± 0.4 mol percent). The relationship remained substantially unaffected for differing amounts of magnesium inclusion over the range of up to 12 mol percent of initial ingredients in the melt on the basis indicated.

What is claimed is:

1. Phase-matched nonlinear devices for operation over the frequency range of from about 5 micrometers to about 0.4 micrometers provided with first means for introducing electromagnetic radiation containing a component within said wavelength range, and second means for extracting electromagnetic radiation containing a component of a different wavelength within said wavelength range, in which said device depends for its operation on a substantially single crystal body comprising the composition indicated by the nominal formula LiNbO$_3$, said composition having been grown from a melt containing Li$_2$O and Nb$_2$O$_5$ in the molar ratio of from 48.2:51.8 to 49:51, characterized in that said body is grown from a melt initially containing from 1 to 8 mol percent MgO based on the said starting composition.

2. Device of claim 1 in which the MgO composition of the solid is within the range of from 1.5 to 12 mol percent.

3. Device of claim 1 in which said first and second means comprise optically polished parallel flat surfaces.

4. Device of claim 2 in which said second means includes a coating so designed as to preferentially transmit the said second component.

5. Device of claim 1 provided with means for maintaining said body at a temperature of at least 190°C.

6. Device of claim 5 provided with means for maintaining said body at a temperature of at least 250°C.

* * * * *